Patented Apr. 18, 1950

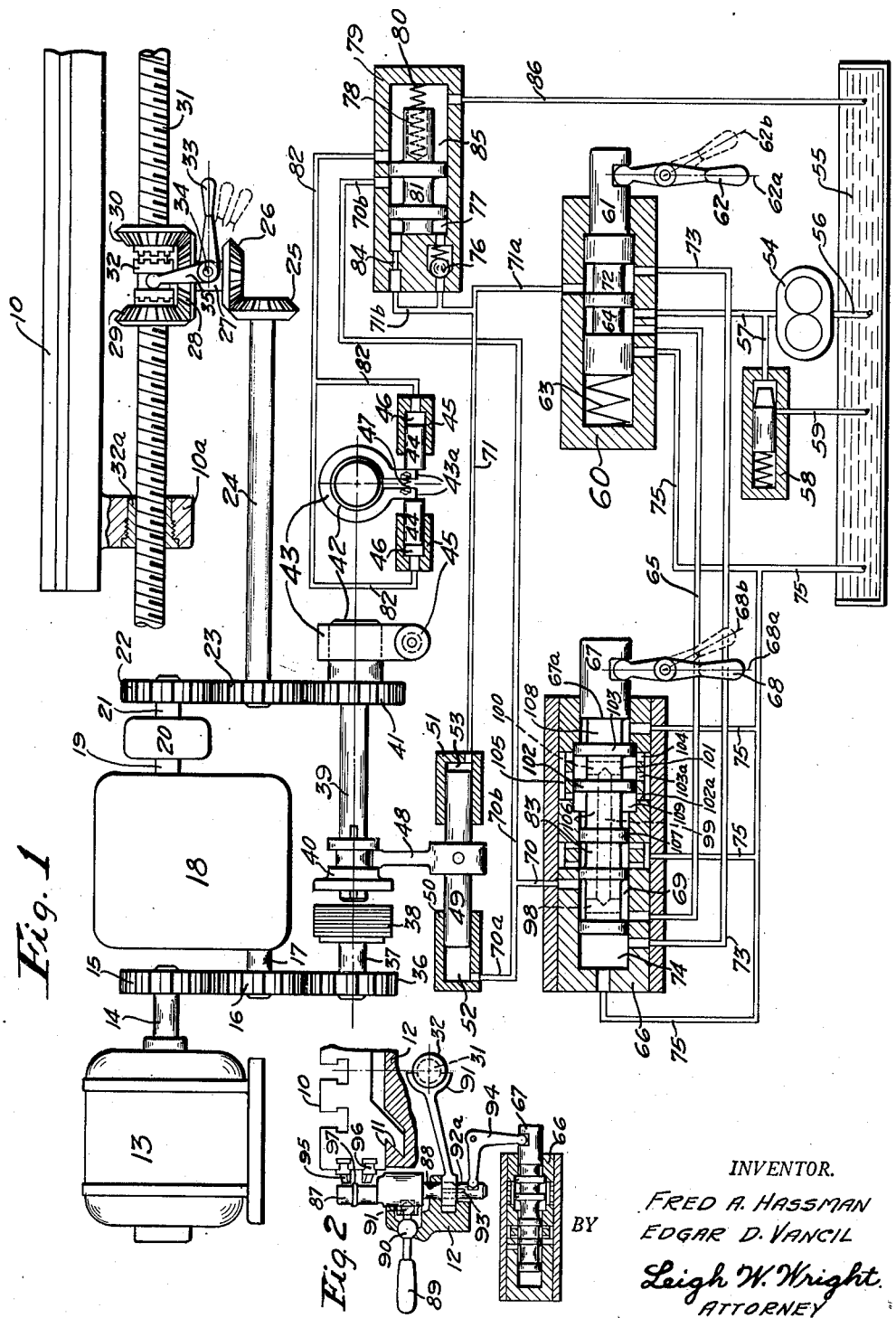

2,504,413

UNITED STATES PATENT OFFICE 2,504,413

BRAKING MECHANISM FOR MACHINE TOOLS

Fred A. Hassman and Edgar D. Vancil, Cincinnati, Ohio, assignors to The Cincinnati Milling Machine Co., Cincinnati, Ohio, a corporation of Ohio Application May 21, 1945, Serial No. 595,002

14 Claims. (Cl. 90—21)

This invention relates to machine tools and more particularly to improvements in milling machines.

An object of this invention is to provide an improved feed and rapid traverse mechanism for a milling machine.

Another object is to provide a feed and rapid traverse mechanism for a milling machine which is sensitive and accurate in controlling a machine member when changing from rapid traverse to feed movement.

And still another object is to provide a feed and rapid traverse control mechanism which is adapted to effect substantially instantaneous changes from rapid traverse movement to feed movement with smoothness and accuracy of control.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Throughout the several views of the drawings similar reference characters are employed to denote the same or similar parts.

Figure 1 is a diagrammatic view of a feed and rapid traverse transmission and control mechanism embodying the features of this invention.

Figure 2 is a diagrammatic view of a trip operated control mechanism for the apparatus of Figure 1.

For exemplary purposes this invention is shown applied to a feed and rapid traverse drive transmission for a machine tool member or milling machine work table 10 which is mounted on suitable dovetailed guideways 11 of the machine frame 12. Power for actuating the work table in feed or rapid traverse movements is derived from a constantly operable prime mover or electric motor 13 having a power shaft 14 to which is fixed a driving pinion 15. This pinion is in operative engagement with a mating gear 16 carried on the input shaft 17 of a feed change transmission 18. The output from the transmission 18 is connected by means of an output shaft 19 to an overrunning clutch 20 which in turn has an output shaft 21 to which is fixed the driving gear 22. The gear 22 drives a mating gear 23 fixed on a shaft 24 upon which is also rigidly fixed a bevel gear 25 arranged to engage a bevel gear 26 carried on a shaft 27. On this shaft is fixed a bevel gear 28 which simultaneously engages a pair of bevel gears 29 and 30 freely rotatable in opposite directions about the actuating screw 31 for the work table. A reversing clutch and disconnect member 32 appropriately connected to drive the screw 31 may be clutched to one or the other of the bevel gears 29 or 30 to effect a reversal of the drive to the screw 31, which operates in an actuating nut 32a carried in an integral bracket 10a of the work table so that rotation of the screw 31 in one direction or the other effects reversible movement in the work table. A table direction control lever 33 mounted on a suitable pin 34 and having a lever arm 35 engaging the clutch member 32 serves to shift the clutch member for effecting reversal or stopping of the movement of the work table 10.

The drive shaft 24 may also be driven at rapid traverse rate from the prime mover 13. This mechanism comprises the gear 36 driven from the gear 16 which is fixed on the shaft 37 containing a multiple disc rapid traverse clutch 38. A second co-axially mounted shaft 39 contains a clutch operating member 40 which may be shifted into engagement with the multiple disc clutch 38 to connect driving power from the shaft 37 to the shaft 39. On the shaft 39 is mounted a gear 41 in driving engagement with the gear 23 on the shaft 24. Thus, whenever the clutch 38 is engaged by shifting the member 40 to the left, Figure 1, a rapid traverse drive, by-passing the feed box 18, is applied to the shaft 24 while the overrunning clutch 20 allows the gear 22 driven from the gear 23, to rotate at the rapid rate without effecting the drive through the change feed transmission 18. When the member 40 is disengaged from the clutch 38 the slow feed drive is automatically picked up by the overrunning clutch 20 from the change feed transmission 18 to again operate the work table at a desired feed rate.

Also fixed on the shaft 39 is a brake drum 42 around which is provided a rapid traverse momentum brake 43 having integral lugs 43a which are engaged by pressure plungers 44 operating in appropriate cylinders 45. When fluid pressure is applied in the pressure chambers 46 in the cylinders 45 the pressure plungers 44 operating against the lugs 43a will close the brake 43 and grip the brake drum 42 to decelerate rapid traverse rotation of the shaft 39, the shaft 24, and the other associated driving transmission connected to the table 10 and to the overrunning clutch 20. A suitable compression spring 47 positioned between the lugs 43a serves to rapidly disengage the brake 43 when pressure is released from behind the pressure plungers 44.

The rapid traverse clutch member 40 is actuated by a shifter fork 48 fixed to a hydraulically operated plunger 49 carried in suitable pressure cylinders 50 and 51 having the respective pressure chambers 52 and 53, so that when pressure is applied in the pressure chamber 52 the rapid traverse clutch 38 is disengaged allowing the feed drive to operate the work table 10 as described. When pressure is applied in the pressure chamber 53 of the cylinder 41 the clutch member 40 will be engaged with the multiple disc clutch 38 to thereby apply the rapid traverse drive power to the work table 10.

At the instant when the rapid traverse clutch 38 is disengaged the brake 43 is automatically instantly engaged so as to very rapidly decelerate the rapid traverse movement of the work table down to the speed at which it is picked up in feed drive by the overrunning clutch 29. When this condition has been reached the brake is arranged to release, allowing freedom of movement of the work table at feed movement. Thus, when the rapid traverse movement is disengaged the brake operates to snub or arrest rapid traverse coasting momentum in the work table and its driving transmission, so as to substantially instantly bring it down to feed movement to thereby prevent overtravel of the table when the rapid traverse is disengaged.

Preferably this coordinated operation of the rapid traverse clutch and the hydraulic snubbing or braking device for arresting the rapid traverse movement at the instant it is disconnected is accomplished by hydraulically controlled mechanism. This mechanism comprises a fluid pressure pump 54 which receives a supply of fluid from a reservoir 55 through a suction line 56 and transmits it under pressure to a pressure line 57 in which is connected a suitable hydraulic relief valve 58 connected through a drain 59 for return of fluid to reservoir 55 to thereby maintain a desired uniform fluid pressure in the line 57. This line is connected to a control valve 60 having an axially shiftable plunger 61 actuated by a control lever 62.

Normally the valve 61 and control lever 62 are held in the position shown in Figure 1 by a compression spring 63 so that fluid pressure from the line 57 passes through the annular groove 64 in the valve plunger 61 into the line 65 which is connected to a second valve 66 having a plunger 67 to which may be connected a suitable operating lever 68. The valve plunger 67 is shown in feed position in Figure 1 so that the line 65 is at this time connected through the annular groove 69 of the plunger 67 to the line 70, a branch line 70a which is connected to supply fluid pressure to the chamber 52 of the cylinder 50 to actuate the plunger 49 to disengage the rapid traverse clutch 38. Discharge at this time from the pressure chamber 53 in the cylinder 51 passes out through the line 71 and the branch line 71a to the valve 60, through the annular groove 72 in the valve plunger 61 to the line 73, this line being connected at this time to the chamber 74 of the valve 66 which in turn is connected by drain line 75 for return of fluid to the reservoir 55.

Either of the control levers 62 or 68 may be manipulated from their respective feed positions 62a and 68a to their rapid traverse positions 62b and 68b to effect the rapid traverse movement in the work table 10. When the control lever 62 of the valve 60 is moved to the rapid traverse position 62b the plunger 61 will be so moved that fluid pressure from the line 57 will be connected through the annular groove 72 of the valve plunger 61 to the lines 71a and 71 so that fluid pressure will be applied in the pressure chamber 53 in the cylinder 51 to thereby cause the plunger 49 to shift to engage the rapid traverse clutch 38. Fluid pressure will be discharged at this time out of the pressure chamber 52 of the cylinder 50 through the lines 70a and 70 and through the annular groove 69 in the valve plunger 67 to the line 65 which at this time is connected to the drain line 75 through the annular groove 64 of the valve plunger 61 of the valve 60 to return the fluid to the reservoir 55.

As the rapid traverse clutch 38 is engaged and pressure builds up in the chamber 53 of the cylinder 51, pressure will build up in the lines 71 and 71a and also in the branch line 71b which is connected through a check valve 76 to the pressure chamber 77 behind the plunger 78 of the delay valve 79. This valve plunger 78 is normally urged in opposition to pressure in the chamber 77 by a suitable compression spring 80. Pressure in the chamber 77 will move the plunger 78 against the spring 80 so as ultimately to arrive at a position wherein line 70b will be connected through the annular groove 81 of the valve plunger 78 to the line 82 which is connected to the brake operating cylinders 45 to connect the pressure chambers 46 to the drain line 75 through the valves 66 and 60 as described.

Similarly, when the control lever 68 of the control valve 66 is moved to rapid traverse position 68b (with the control lever 62 of the valve 60 in its normal position shown in Figure 1), fluid pressure from the line 57 passing through the annular groove 64 of the valve plunger 61 into the line 65 is now connected through the annular groove 69 of the valve plunger 67 to the line 73, then through the annular groove 72 of the valve plunger 61 to the line 71a and line 71 to the pressure chamber 53 in the cylinder 51 to effect engagement of the rapid traverse clutch. Fluid discharged at this time from the pressure chamber 52 in the cylinder 50 will pass through the lines 70 and 70a to the valve 66 and then through the annular groove 83 to the drain line 75 for return of fluid to the reservoir 55.

When either of the control valves 60 or 66 is operated to disconnect the rapid traverse drive, the brake 43 is momentarily engaged for a predetermined period to rapidly decelerate the work table and associated driving transmission and prevent over-travel of the rapid traverse movement when it is desired to change to feed motion. As the work table reaches feeding speed the brake disengages. When the control lever 62 of the valve 60 is moved from the rapid position 62b back to the feed position 62a, pressure in the lines 71, 71a, and 71b will be connected to the drain line 75 through the annular groove 72 of the valve plunger 61 and the line 73 connected through the chamber 74 of the valve 66 to the drain line 75. This reduces pressure coming in through the check valve 76 in the chamber 77 so that the spring 80 may move the valve plunger 81 in the delay valve 79 to displace fluid out of the chamber 77 through a fluid resistance 84 (the check valve 76 being closed at this time) so that fluid escapes slowly during a predetermined interval of time out of the chamber 77 into the line 71b and is thus returned to the reservoir 55 as described.

The plunger 81 does not instantly return to the position shown in Figure 1 when the rapid traverse movement is stopped but moves slowly as fluid escapes through the resistance 84 to maintain communication between the lines 70 and 82 for a predetermined interval of time. This enables pressure from the line 57 passing through the annular groove 64 in the plunger 61 of the valve 60 and passing through the line 65, the annular groove 69 in valve plunger 67, and into the lines 70 and 70b to maintain pressure in the cylinders 45 behind the plungers 44 to thereby engage the brake 43 and maintain it engaged for a predetermined period of time. As the plunger 81 gradually moves to assume the position shown in Figure 1, the line 70 is ultimately cut off from the line 82, while the line 82 is connected through the chamber 85 in the valve 79 to the drain line 86 to release pressure behind the cylinders 45 and disengage the brake after the predetermined interval of travel of the plunger 81 has elapsed.

Also when the valve 66 is moved back from rapid traverse position to feed position as shown in Figure 1, pressure will be similarly connected from the line 57 through the annular groove 64 of valve plunger 61 through the line 65, the annular groove 69 in valve plunger 67 to the lines 70 and 70b through the annular groove 81 of valve plunger 78 to the line 82. The plunger 78 at this time is just beginning its discharge stroke as fluid escapes through the resistance 84 and to again delay the release of pressure from the brake 43 for a predetermined interval of time as described, the lines 71, 71a, and 71b at this time being connected through the annular groove 72 in the valve plunger 61 through the line 73 and the chamber 74 in the valve 66 to the drain line 75.

Thus, when either of the control valves 60 or 66 is operated from a rapid traverse position back to feed position the brake 43 is momentarily applied for a predetermined interval of time sufficient to rapidly decelerate the coasting rapid traverse momentum of the work table and associated driving transmission and bring it down to feeding speed provided by power through the overrunning clutch 20. This interval is so regulated by adjusting the fluid resistance 84 that the brake 43 will be automatically released at the time the feed drive is picked up by the overrunning clutch 20.

In some instances it may be preferable to control the feed and rapid traverse movement automatically by the movement of the work table 10. This may be done by providing trip operated control mechanism in connection with the direction selector clutch 32 and the rapid traverse control valve 66. A single lever control arrangement, for example as shown in Patent No. 1,390,706, may be utilized to combine the functions of both the direction control lever 33 and the feed and rapid traverse control lever 68. Such an arrangement is diagrammatically shown in Figure 2 and may comprise a trip plunger 87 which is journaled for both rotary and axial movement in a suitable bearing 88 in the frame 12 of the machine. A single control lever 89 mounted in a ball and socket joint 90 carried in the frame 12 of the machine has an inwardly projecting ball portion 91 operatively engaging in a socket formed in the trip plunger 87 so that when the lever is moved in a horizontal plane the trip plunger 87 is rotated in the bore 88 and when the lever is moved up and down in the vertical plane the trip plunger 87 may be moved axially in said bore.

Horizontal movement of the lever 89 shifts the direction control clutch 32 through a shifter fork 92 which is keyed at 93 to rotate with the trip plunger 87 while allowing axial movement of the trip plunger in the bore 92a of the shifter fork. The vertical movement of the control lever 89 is transmitted to a bell crank lever 94 to actuate the rapid traverse control valve 66. Thus, vertical movements of the lever 89 change the rate of movement of the table from feed to rapid traverse or rapid traverse to feed. Horizontal movement of the lever 89 changes direction or stops movement of the work table. Suitable trip dogs 95 and 96 carried by the work table are arranged to engage the lugs 97 on the trip plunger 87 to appropriately actuate the plunger in both rotary and axial movements in accordance with the above-mentioned patent to provide the desired sequence of rate and direction changes for an automatic work cycle of the machine.

Preferably the valve plunger 67 is provided with hydraulic load and fire detent means so that it may be rapidly positioned in either feed or rapid traverse position when actuated by the trip dogs 95 or 96. When the plunger 67 is in the feed position as shown in Figure 1 fluid pressure from the line 57 passing through the annular groove 64 of valve plunger 61 in the valve 60 into the line 65, connected at this time to the annular groove 69 in the valve plunger 67, passes through the diametral passageway 98 which communicates with an axially extending passageway 99 formed in the valve plunger 67 which, in turn, communicates with a diametral passageway 100 communicating with the annular groove 101 formed between the enlarged spools 102 and 103 of the valve plunger 67. Thus, pressure at this time exists in all three of the ports 102a, 103a, and 104 which are in common communication with the wide annular groove 105 formed in the valve 66. Also pressure exists at this time in the annular groove 106 formed between the spools 102 and 107, the spool 107 being of smaller diameter in cross sectional area than the spool 102.

As the valve plunger is moved, from the feed position shown in Figure 1, to the left toward rapid traverse position, the ports 102a and 104 are respectively closed by the spools 102 and 103 as the valve plunger 67 arrives at its intermediate position. As this intermediate position is reached the spool 107 has moved so as to connect the annular groove 106 to the drain line 75 to thereby relieve pressure in the annular groove 106. Continued movement of the plunger 67 beyond its intermediate position then connects fluid pressure from the port 104 into the annular groove 108 formed by the large spool 103 and the smaller head portion 67a of the plunger 67. The difference in areas between the spool 103 and the head 67a causes fluid pressure to rapidly move the valve to the left automatically without further mechanical assistance from the trip mechanism. This movement is ultimately stopped when the spool 102 has moved up against abutment surface 109. The ports 102a and 103a are now in communication with the annular groove 100 to receive pressure supply from the pump 54 and thereby firmly hold the valve plunger 67 in the rapid traverse position.

A similar load and fire action takes place when the valve plunger 67 is moved in the opposite direction from rapid traverse back to feed position. As the plunger 67 is moved to the right from rapid traverse position the spools 102 and 103 respectively close off ports 102a and 103a as the intermediate position of movement of the plunger is reached. Further movement of the plunger will connect fluid pressure from the port 102a to the annular groove 106 between the large spool 102 and smaller spool 107 to thus cause the plunger to continue its movement under fluid pressure actuation until it reaches the position shown in Figure 1. During this last stage of movement the annular groove 108 of the valve plunger is connected to the drain line 75 to allow freedom of movement of the plunger under hydraulic actuation.

There has thus been provided a sensitive and efficient transmission and control mechanism which may be trip operated in an automatic work cycle for effecting feed and rapid traverse movements and change of direction of said movements in a work feeding member or work table of a milling machine.

What is claimed is:

1. In a milling machine transmission and control mechanism, a prime mover, an actuable machine tool slide, a feed change transmission driven by said prime mover, an overrunning clutch driven from said feed change transmission, a reverser coupling connected between said overrunning clutch and said slide, a rapid traverse drive transmission driven from said prime mover including a rapid traverse clutch and a driving connection from said clutch to said reverser coupling, a fluid pressure actuator for said rapid traverse clutch, a rapid traverse momentum brake between said clutch and said reverser coupling, a fluid pressure actuator for said brake, and fluid pressure control means for said actuators operable to effect a predetermined sequential operation of said rapid traverse clutch and said brake to cause said brake to momentarily operate upon disengagement of said rapid traverse clutch to decelerate rapid traverse movement in said slide.

2. In a transmission and control mechanism for a milling machine work table, a prime mover, a change feed transmission driven by said prime mover, an overrunning clutch connected to the output of said change feed transmission, reversible nut and screw operating mechanism for operating said work table connected to be driven from said overrunning clutch, a rapid traverse transmission driven from said prime mover including a rapid traverse clutch connected to drive said nut and screw mechanism, a brake associated with said nut and screw mechanism operable to retard operation thereof, fluid pressure actuating means for said rapid traverse clutch, fluid pressure actuating means for said brake, fluid pressure control means for said actuating means operable to momentarily actuate said brake to retard operation of said nut and screw mechanism upon disengagement of the rapid traverse clutch, and further fluid pressure control means interconnected with said first-mentioned control means to maintain actuation of said brake until said nut and screw mechanism becomes automatically driven from said overrunning clutch.

3. In a milling machine transmission and control mechanism for actuating a milling machine work table including the combination of a prime mover, feed and rapid traverse transmissions connected to be driven from said prime mover, nut and screw operating mechanism operable to actuate said table, means for connecting said feed transmission through an overrunning clutch to said nut and screw mechanism, means for connecting said rapid traverse transmission through a rapid traverse clutch to said nut and screw mechanism, a brake operable to retard movement of said nut and screw mechanism, fluid pressure actuating means for said rapid traverse clutch, fluid pressure actuating means for said brake, fluid pressure control means for said actuating means operable to cause simultaneous disengagement of said rapid traverse clutch engagement of said brake, and further fluid pressure control means rendered operative by said first-mentioned control means to momentarily actuate said brake to retard rapid traverse coasting momentum in said nut and screw mechanism until said feed drive is transmitted through said overrunning clutch to said mechanism.

4. In a transmission and control mechanism for a milling machine work table, a prime mover, a change feed transmission driven by said prime mover, a rapid traverse transmission driven by said prime mover, a reversible drive mechanism connected to actuate said work table, an overrunning clutch connecting said change feed transmission to said drive mechanism, a rapid traverse clutch connecting said rapid traverse transmission to said drive mechanism, a hydraulic actuator for said rapid traverse clutch, a brake associated with said drive mechanism, a hydraulic actuator for said brake, a source of fluid pressure, a pair of serially connected manually actuable control valves between said source of fluid pressure and the hydraulic actuator for said rapid traverse clutch, a time delay hydraulic control valve connected between said control valves and the actuator for said brake so that manipulation of either of said control valves to disengage said rapid traverse clutch causes said delay valve to momentarily supply fluid pressure to actuate said brake to retard rotation of said drive mechanism, and hydraulic resistance means in said delay valve to maintain fluid pressure in the actuator for said brake until feed driving power is applied to said drive mechanism from said overrunning clutch, said control valves including means for the application of fluid pressure to said clutch operator to engage said rapid traverse clutch while releasing fluid pressure from the actuator for said brake.

5. In a rapid traverse transmission and control mechanism for a milling machine work table, reversible actuating means connected to said table, a prime mover, a reversible actuator connected to said prime mover through a power transmission mechanism including a feed transmission and an overrunning clutch, means for connecting said reversible actuator to said prime mover through a rapid traverse transmission and a rapid traverse clutch, a brake connected to said reversible actuator to restrict operation thereof, a hydraulic clutch actuator for said rapid traverse clutch, a hydraulic brake actuator for said brake, a source of fluid pressure, a pair of serially connected control valves each operable to selectively apply fluid pressure to said clutch actuator to engage or disengage said clutch, trip control means associated with one of said valves and said reversible actuator operable by the movement of said work table, a fluid pressure operated delay valve interconnected with both of said control valves and said brake actuator to cause engagement of said brake upon disengagement of said rapid traverse clutch and maintaining said brake engagement for a predetermined interval of time after the disengagement of said rapid traverse clutch.

6. In a transmission and control mechanism for a milling machine work table, a prime mover, a change feed transmission driven by said prime mover, an overrunning clutch driven from said change feed transmission, a reversible power transmission connected to actuate said work table and driven at feeding rates from said overrunning clutch, a rapid traverse clutch connected to said reversible power transmission driven by said prime mover at a rapid traverse rate, a brake operatively associated with said reversible power transmission, a first control means for reversing said power transmission, a plurality of control means for said rapid traverse clutch and said brake, each operable to engage or disengage said rapid traverse clutch and to momentarily engage said brake upon disengagement of said clutch, a control device associated with said brake to maintain operative engagement thereof for a predetermined interval of time after said rapid traverse clutch has been disengaged, and operating connections between said first control means and one of the plurality of controls whereby joint determination of rate and direction may be effected.

7. In a transmission and control mechanism for a milling machine work table, a prime mover, a change feed transmission driven by said prime mover, an overrunning clutch interconnecting said change feed transmission and driving mechanism for said work table, a reverser coupling in said driving mechanism, a manually operable control lever for operating said reverser coupling, a rapid traverse drive from said prime mover to said reverser coupling including a rapid traverse clutch, a brake operatively related to said reverser coupling effective when operated to restrict rapid traverse motion of said coupling and said work table, a fluid pressure actuator for said rapid traverse clutch, a fluid pressure actuator for said brake, a pair of fluid pressure control valves interconnecting said actuators to a source of fluid pressure, a fluid pressure time delay valve interconnected between said brake actuator and said control valves, and fluid control means in each of said valves operable upon independent manipulation of each of said valves to operate said actuators and said time delay valve in a predetermined operating sequence.

8. In a transmission and control mechanism for a milling machine work table, a prime mover, a multi-speed power transmission from said prime mover to an actuator for said work table including a change feed transmission driven from said prime mover and an overrunning clutch connecting the output of said change feed transmission to said actuator for said work table, a rapid traverse drive transmission from said prime mover to said actuator including a rapid traverse clutch, a brake associated with said work table actuator, a fluid pressure actuator for said rapid traverse clutch, a fluid pressure actuator for said brake, a pair of fluid pressure control valves serially interconnected, a source of fluid pressure connected to said valves, means for connecting said valves to the actuator for said rapid traverse clutch, a fluid pressure time delay valve connected to said control valves and to the actuator for said brake so that operation of either of said control valves to disengage said rapid traverse clutch causes momentary application of said brake to said work table actuator, said time delay valve serving to maintain engagement of said brake for a predetermined period of time until feed driving power is applied to said work table actuator from said overrunning clutch.

9. In a transmission and control mechanism for a milling machine work table, a prime mover, a change feed transmission driven by said prime mover, an overrunning clutch driven from said change feed transmission, a reversible power transmission connected to actuate said work table and driven at feeding rates from said overrunning clutch, a rapid traverse clutch connected to said reversible power transmission driven by said prime mover at a rapid traverse rate, a brake operatively connected to said reversible power transmission, a fluid pressure rapid traverse clutch actuator, a fluid pressure brake actuator, a trip operated single lever control mechanism for said actuators and said reversible power transmission operable manually or by trip action from the movement of said work table, a fluid pressure time delay control valve associated with the hydraulic brake actuator operable upon engagement of said rapid traverse clutch to cause said time delay valve to disengage said brake, and further fluid pressure control means operable by the movement of said trip control valve to engage said brake and maintain said engagement for a predetermined interval of time until feed driving power from said overrunning clutch becomes effective to drive said work table.

10. In a milling machine transmission and control mechanism, the combination with a movable support, of a rapid traverse transmission, a prime mover, a clutch for connecting the prime mover to said transmission, a brake for said transmission, a source of pressure, fluid actuable means for said clutch including a pair of lines alternatively connectable to said pressure to effect engagement and disengagement of said clutch, and means responsive to pressure in one line to connect the other line to said brake whereby upon connection of pressure to said other line to effect disengagement of said clutch said brake will be simultaneously applied.

11. In a milling machine transmission and control mechanism, the combination with a movable support, of a rapid traverse transmission, a prime mover, a clutch for connecting the prime mover to said transmission, a brake for said transmission, a source of pressure, fluid actuable means for said clutch including a pair of lines alternatively connectable to said pressure to effect engagement and disengagement of said clutch, means responsive to pressure in one line to connect the other line to said brake whereby upon connection of pressure to said other line to effect disengagement of said clutch said brake will be simultaneously applied, and automatic means for effecting a delayed disconnection of said other line from said brake whereby said brake will be released after the clutch is disengaged.

12. In a milling machine transmission and control mechanism, the combination with a movable support, of a rapid traverse transmission therefor, a prime mover, a clutch for connecting the prime mover to the transmission, a fluid operable brake for said transmission, a source of pressure, fluid actuable means for said clutch including a pair of channels, a first control valve for connecting pressure to one of said channels to effect engagement of the clutch, a second control valve for connecting pressure to said one of said channels to effect engagement of said clutch, means responsive to pressure in the last-named channel to connect the other channel to said fluid operable brake, said control valves having means alternatively operable for connecting said source of pressure to said other channel to effect disengagement of the clutch and application of the brake, and automatic means independently operable for subsequently releasing said brake.

13. In a milling machine transmission and control mechanism, the combination with a movable support, of a rapid traverse transmission therefor, a prime mover, a clutch for connecting the transmission to the support, a brake for said transmission, a source of fluid pressure, fluid actuable means for shifting said clutch including a pair of control channels, a pair of spaced control valves alternatively operable for connecting said source of pressure to one of said channels, means trip operable by said support for actuating one of said valves, means responsive to pressure in said one channel for connecting the other channel to said brake, whereby upon admission of pressure to the last-named channel to effect disengagement of said clutch said brake will be applied, and means automatically operable subsequently thereto for effecting release of said brake.

14. In a milling machine transmission and control mechanism, the combination with a movable support, of a motion transmitting train, a prime mover, a clutch for connecting the prime mover for rapid traverse actuation of said train, a fluid operable brake for said train, a source of fluid pressure, fluid actuable means for said clutch including a pair of control channels, a pair of control valves, one of which is trip operable by the support, said valves being alternatively operable for connecting said source of pressure to one of said channels to effect engagement of said clutch, means responsive to pressure in the last-named channel to connect the other channel to said brake, either of said valves being operable to connect pressure to said other channel to effect disengagement of the clutch and application of the brake, an overrunning feed drive for said power train, and automatically operable means effective upon disconnection of pressure from said one channel to effect a delayed disconnection of pressure from said other channel after disengagement of said clutch to permit said overrunning drive to become effective.

FRED A. HASSMAN.
EDGAR D. VANCIL.

REFERENCES CITED

The following references are of record in the file of this patent:

UNITED STATES PATENTS

| Number | Name | Date |
|---|---|---|
| 1,799,272 | Armitage | Apr. 7, 1931 |
| 2,070,808 | Romaine et al. | Feb. 16, 1937 |
| 2,407,913 | Armitage et al. | Sept. 17, 1946 |